United States Patent
DeMott et al.

(10) Patent No.: US 6,770,581 B1
(45) Date of Patent: Aug. 3, 2004

(54) ABSORBENT FABRICS, PRODUCTS, AND METHODS

(75) Inventors: Roy P. DeMott, Spartanburg, SC (US);
Kimberly C. Gillis, Moore, SC (US);
Ernest G. Stringer, Spartanburg, SC (US)

(73) Assignee: Milliken & Company, Spartanburg, SC (US)

(*) Notice: Subject to any disclaimer, the term of this patent is extended or adjusted under 35 U.S.C. 154(b) by 0 days.

(21) Appl. No.: 09/527,629

(22) Filed: Mar. 17, 2000

(51) Int. Cl.[7] .......................... D06C 11/00; B32B 33/00; D04B 21/20

(52) U.S. Cl. .......................... 442/312; 442/93; 442/97; 442/102; 442/118; 428/91; 428/96; 428/97

(58) Field of Search .............. 442/312, 93, 97, 442/102, 118; 66/194, 202; 428/91, 96, 97

(56) References Cited

U.S. PATENT DOCUMENTS

| | | | |
|---|---|---|---|
| 3,377,249 A | 4/1968 | Marco | 8/115.6 |
| 3,540,835 A | 11/1970 | Marco | 8/115.6 |
| 3,620,826 A | 11/1971 | Machell | 117/139.5 |
| 3,632,420 A | 1/1972 | Kuhn | 117/138.8 F |
| 3,652,212 A | 3/1972 | Machell | 8/115.5 |
| 4,038,027 A | 7/1977 | Kearney | 8/120 |
| 4,131,550 A | 12/1978 | Marco | 252/8.6 |
| 4,168,954 A | 9/1979 | Marco | 8/18 R |
| 4,240,795 A | 12/1980 | Hendrix | 8/115.6 |
| 4,290,765 A * | 9/1981 | Sandler | 8/115.6 |
| 4,318,956 A | 3/1982 | Stevens et al. | 428/265 |
| 4,427,557 A * | 1/1984 | Stockburger | 442/95 |
| 4,482,593 A | 11/1984 | Sagel et al. | 428/90 |
| 4,679,859 A | 7/1987 | Wilson | 300/21 |
| 4,712,281 A * | 12/1987 | Scheller | 28/162 |
| 4,978,566 A | 12/1990 | Scheurer et al. | 428/157 |
| 5,370,933 A | 12/1994 | Govindan | 428/272 |
| 5,486,500 A | 1/1996 | Kaufman | 503/227 |
| 5,557,950 A | 9/1996 | Richards et al. | 66/194 |
| 5,725,951 A | 3/1998 | Schuette et al. | 428/375 |
| 5,817,391 A | 10/1998 | Rock et al. | 428/816 |
| 5,916,273 A | 6/1999 | Hepfinger | 66/194 |
| 5,935,484 A | 8/1999 | Schuette et al. | 252/8.62 |
| 5,962,350 A | 10/1999 | Krotine | 442/370 |
| 5,968,207 A | 10/1999 | Li | 8/490 |
| 6,025,284 A | 2/2000 | Marco et al. | 442/133 |

FOREIGN PATENT DOCUMENTS

| | | |
|---|---|---|
| AU | 199884182 A1 | 3/2000 |
| AU | 721721 | 6/2000 |
| DE | 4318500 | 12/1994 |
| EP | 0 107 197 | 5/1984 |
| EP | 0 429 802 A3 | 10/1990 |
| EP | 0 429 802 A2 | 10/1990 |
| EP | 0429802 | 6/1991 |
| EP | 0 515 206 | 5/1992 |
| EP | 9 631 860 | 6/1994 |
| EP | 1 013 809 | 6/2000 |
| GB | 2 054 369 | 2/1981 |
| GB | 2 229 083 A | 9/1990 |
| JP | 57046846 | 3/1982 |
| JP | 02045016 | 2/1990 |
| JP | 04007174 | 10/1992 |
| JP | 6262730 | 9/1995 |
| JP | 09047347 | 2/1997 |
| JP | 10-85114 | 4/1998 |
| JP | 10211078 | 11/1998 |
| WO | WO 9632526 | 10/1996 |
| WO | 00/15085 | 3/2000 |
| ZA | 77/4110 | 7/1977 |

\* cited by examiner

*Primary Examiner*—Cheryl A. Juska
*Assistant Examiner*—Jenna-Leigh Befumo
(74) *Attorney, Agent, or Firm*—Terry T. Moyer; Daniel R. Alexander

(57) ABSTRACT

A warp-knitted fabric of at least three-bar construction, having multifilament synthetic pile yarns on the technical back which are raised or broken to produce a plush surface and monofilament synthetic ground yarns on the technical face. The fabric and/or yarns being hydrophilic, absorbent, wicking, launderable, cleanable, durable, colorfast, printable, dimensionally stable, anti-pathogenic, and/or the like.

16 Claims, 4 Drawing Sheets

ABSORBENT FABRICS, PRODUCTS, AND METHODS

BACKGROUND OF THE INVENTION

The present invention relates generally to fabrics, products, and methods of producing such fabrics and products. More specifically, this invention relates to absorbent warp knitted polyester fabrics and methods of producing such fabrics and products.

In warp knitted fabrics, it is known that to create a plush raised surface on its technical back, one set of warp yarns must be knitted in a stitch pattern to produce and extended underlap of yarn on the technical back of the fabric. The technical back can then be brushed to allow the individual fibers of the yarn to be broken and raised to form a plush face. Often, these fibers must then be sheared, in an additional step, to produce a uniform plush face yielding a velour-like effect. However, problems may be encountered with the durability of these fabrics, in that the weakened structures may be susceptible to unwanted performance characteristics such as stretch, creep, and pilling.

U.S. Pat. No. 5,916,273, hereby incorporated by reference, describes an improved warp knitted plush fabric, and method of producing same, whose construction is uniquely suited to resist unwanted performance characteristics such as stretch, creep, and pilling. Briefly described, the desired properties are achieved by using special ground and pile yarns that, in combination, work to resist fabric pilling while minimizing stretch and creep. In one embodiment, the fabric is a textile fabric having at least three bar construction that is warp knitted, and is comprised of ground and pile yarns that are interlocked with one another and parallel to the fabric edge. The resulting stitches are arranged in horizontal rows, or courses, and vertical columns, or wales, formed by the knitting needles during one knitting cycle. In accordance with one embodiment, the pile yarns are multifilament, microdenier synthetic yarns. Microdenier yarns are generally regarded as being equal to or less that 1.1 denier for each filament. On the other hand the ground yarns are synthetic monofilament yarns, each filament of which is no less than 10.0 denier.

A knit polyester fabric tends to be hydrophobic, slow to absorb liquids, exhibits little or no wicking, holds stains, holds odors, and the like. Also, it is known in the fabric industry that polyester knit fabrics are easy to print on, hold dyes well, and the like.

Since polyester is hydrophobic, conventional wisdom would lead one to choose a cotton blend or a cotton fabric if they wanted a fabric which was absorbent. For example, a cleaning cloth would be made of a 100% cotton terry cloth or a cotton and polyester blend fabric. One would not typically use a polyester or synthetic knit fabric as a cleaning cloth since such fabrics tend to be hydrophobic, do not absorb water well, have poor wicking, low moisture retention, and the like.

Conventional cleaning cloths for wet or dry cleaning of household surfaces such as carpets, upholstery, clothing, furniture, floors, counter tops, and the like are usually made from cotton fabric or synthetic and cotton blend fabrics.

With respect to conventional absorbent articles such as diapers, it is commonly believed that one must use a cotton material or a cotton blend as an underlayer to absorb, wick, and retain liquids such as water or urine away from, for example, an open knit top layer. It is conventional wisdom that the absorbent underlayer must be cotton and that there must be an underlayer in addition to a top synthetic layer.

For example, adult incontinent undergarments or diapers may have an absorbent insert or area employing a combination of multiple layers of highly absorbent fabric with an open knit top layer making contact with the skin. The absorbent fabric layer, or layers, may be hydrophilic cellulosic fibers, cotton fabric, or the like.

Hence, there is a need for an improved polyester or synthetic fabric or product, and method which provides for enhanced absorbency, wicking, soil release, and/or odor removal and/or which is hydrophilic, absorbent, wicking, laundrable, cleanable, printable, non-fraying, dimensionally stable, colorfast, anti-pathogenic, and/or combinations thereof.

SUMMARY OF THE INVENTION

In accordance with one embodiment of the present invention, a chemically treated polyester microdenier knit fabric is provided which has enhanced wicking, moisture absorption, stain removal, and/or odor removal. The chemical treatment provides increased wicking action and moisture absorption and facilitates stain release and odor removal. The microdenier knit construction provides that the fabric will not fray after laundering, has increased surface area for improved print definition, greater surface area for increased moisture absorption and quick evaporation, and a unique loop structure which facilitates moisture transfer from the surface (quick absorption and instant wicking). The polyester fiber also provides heat transfer print capability, durability to successive industrial launderings, and retains its original shape and appearance.

In accordance with one test for wicking and moisture absorption of a treated polyester fabric, the wicking performance or rate of rise was 4" at five minutes, 5.5" at fifteen minutes, and 6.5" at thirty minutes. The wet pickup was 356% at zero minutes, 206% at five minutes, 186% at ten minutes, 178% at fifteen minutes, and 164% at thirty minutes. The polyester microdenier knit fabric of the present invention instantaneously wicks moisture away from the surface and absorbs more than twice its weight in liquid. The chemical treatment also facilitates stain release and odor removal. The fabric may also be treated to provide anti-bacterial, anti-viral, anti-microbial, anti-fungal and/or anti-pathogenic agents to the fabric.

As described in U.S. Pat. No. 5,916,273 and in accordance with a preferred embodiment of the present invention, the pile yarns are warp knitted with extended underlaps between the stitches on the technical back, to provide significant yarn area. This yarn area is subsequently raised by napping, sanding, brushing, or any other method that raises and breaks the filaments to form a plush surface. The ground yarns are warp knitted in a dimensionally stable stitch pattern, predominantly on the technical face of the fabric, to resist stretch of the fabric in a direction parallel to the fabric edge. In a preferred embodiment, for. example, the pile yarns may be knitted in a 1-0, 4-5 stitch pattern, while the ground yarns are knitted in a 1-0, 0-1 and 1-0, 2-3 stitch pattern.

As described above, the pile yarns comprise the technical back of the fabric during fabric construction; however, after the pile yarns are raised to form a plush surface, the plush pile surface is considered the front or face of the finished fabric (absorbent, print receiving surface). Conversely, the ground yarns, which comprise the technical face of the fabric during construction, are considered the back or bottom of the finished fabric. Although it is preferred to use the pile side as the upper surface (it prints better and has a better appearance), it is contemplated that both surfaces of the fabric are absorbent and that either face may be used as the upper or lower surface as desired.

According to a further aspect of the invention, there is provided a fabric, product, article, composite, assembly, or the like having at least an upper surface which is absorbent, wicking, hydrophilic, printable, launderable, cleanable, and/or combinations thereof.

DESCRIPTION OF THE PREFERRED EMBODIMENTS

In accordance with an exemplary embodiment of the present invention, an absorbent, launderable, printable, non-fraying, dimensionally stable, colorfast, hydrophilic fabric, product, article, composite, assembly textile material, or the like is provided by chemically treating a knit polyester fabric and more particularly a warp-knitted microdenier dense polyester fabric. The preferred hydrophilic polyester fabric of the present invention is highly absorbent, has instantaneous wicking, has good liquid holding capability, and the like which make the fabric of the present invention useable in products and applications which were heretofore thought to be served by absorbent cotton, cotton blends, or multi-layer fabric items having a loose knit top layer and a cotton bottom layer or sub layer. Moreover, the performance and characteristics of the preferred treated polyester yarn and/or fabric of the present invention are superior to those of conventional cotton or cotton blends and make the fabric of the present invention a desirable substitute for conventional cotton and cotton blend products.

Although the present invention is described in detail with respect to the preferred embodiment of a treated polyester knit fabric, it is contemplated that other synthetic fabrics or yarns may be used, for example, Rayon, Nylon, corn fiber, and the like or fabric blends such as rayon and polyester, cotton and polyester and the like, hydrophilic fibers, and/or other fibers that are conducive to printing and are naturally hydrophilic or can be treated to be hydrophilic.

Figure 1:
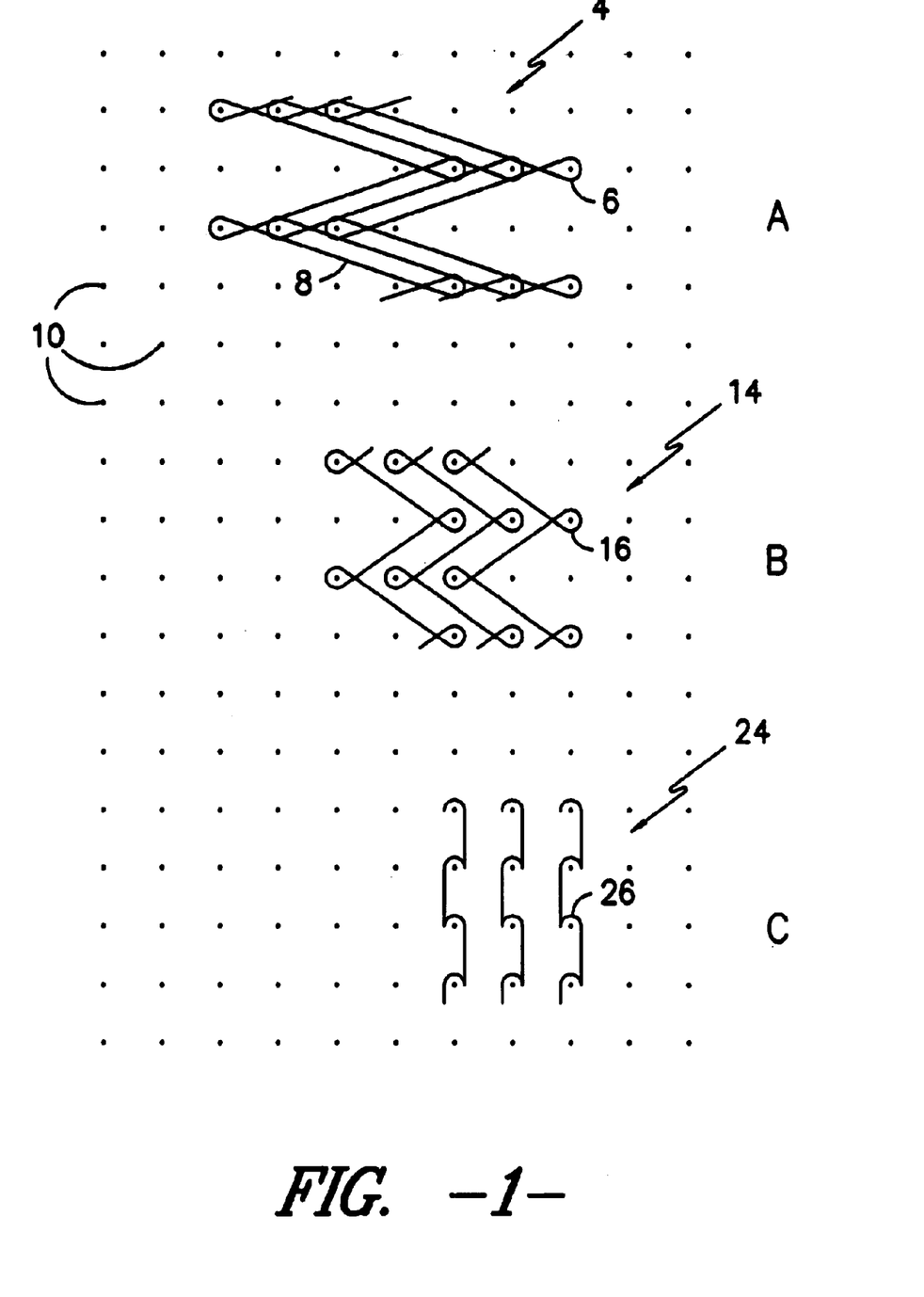
FIG. 1 shows, via a conventional dot diagram, the stitch orientation for a preferred embodiment of the present invention, as knitted, for example, on a Tricot machine, and also details the pile yarn (technical back, indicated at A) and the two ground yarns (middle and technical face, indicated at B and C, respectively).

Referring to the accompanying drawing, FIG. 1 depicts a preferred and exemplary embodiment of the preferred fabric of the present invention, a warp-knitted three-bar construction knitted on a multi-bar knitting machine. The warp-knitting machine may be a convention Raschel or Tricot warp-knitting machine, or any other machine of conventional three-bar (or more) construction, having three or more yarn guide bars and a needle bar. In accordance with the conventional terminology, the bar construction of the warp-knitting machine refers to the number of yarn guide bars of the machine, while the bar construction of the warp knitted fabric refers to the number of different warp yarns included in the fabric. The set-up and operation of such machines are well known in the industry and the warp-knitting art, and will not be specifically described in detail.

The guide bars can be described as "top", "middle", and "bottom," or bar 1, bar 2, and bar 3, respectively. These designations are for reference purposes only. Individuals skilled in the art will understand that such terms describe a variety of knitting machines having guide bars that may also be referred to as "front", "middle", and "back" guide bars, respectively. Fabrics produced on these latter types of warp-knitting machines are intended to be included within the scope of the present invention.

Typically, machines are configured such that the guide bars of the machine each carry a series of aligned guides to hold the incoming yarn, while the needle bar carries a series of aligned knitting needles. The needle bar and the guide bars should be of the same gauge, that is, have the same number of needles or guides per inch. According to a preferred embodiment of the present invention depicted in FIG. 1, the bottom guide bar A is fully threaded, that is, each guide is threaded with one yarn, with a single set of yarns 4 delivered from a warp beam, while the middle and top guide bars B, C are also fully threaded with a second 14 and third 24 set of yarns, respectively delivered from a second and third set of warp beams (not shown).

While it is possible to use a variety of yarns to create the plush fabric, it is preferred that the yarns be relatively stretch free to help provide dimensional stability to the fabric. In addition, it is further preferred that the bottom or pile yarns 4 in the bottom guide bar be multifilament synthetic yarns, and preferably microdenier polyester yarns, to provide a velvet hand and soft feel upon further processing. The denier of the pile yarns 4 may vary, depending upon the desired weight of the fabric for the particular end use, but the denier per filament of the yarn should not exceed 1.1 denier. On the other hand, the ground yarns 14, 24, associated with the middle and top guide bars, respectively, should be monofilament synthetic yarns, and preferably polyester. Monofilament polyester, being a single fiber without crimp or entanglement will resist stretch and creep over time when exposed to a constant stress load. Although it is preferred to use a monofillament ground yarn, it is to be understood that multifilament ground yarns could be used. It is contemplated that each pile yarn 4 should have a total denier of at least 50 denier, and be comprised of at least about 50 individual filaments. Each of the ground yarns 14, 24 should have a total denier of at least 10 denier, with the total denier of the two ground yarns 14, 24 not exceeding that of the pile yarn 4.

A preferred embodiment of the fabric is illustrated in FIG. 1. The stitch construction of the pile yarns 4 and two ground yarns 14, 24, as carried out by the respectively lateral traversing movements of the guide bars of the knitting machine, are illustrated in a conventional dot diagram, in which the individual points 10 represent the needles of the needle bar of the warp knitting machine in the formation of successive courses against several successive wales.

According to this embodiment, the bottom guide bar (bar 3) of the machine manipulates the pile yarns 4 to traverse laterally back and forth relative to the needles 10 of the needle bar of the machine to stitch the pile yarns 4 in a repeating 1-0, 4-5 stitch pattern as indicated in A of FIG. 1. Simultaneously, the middle guide bar (bar 2) manipulates one set of ground yarns 14 as they are fed from their respective warp beam to traverse the knitting needles 10 to stitch the ground yarns in a repeating 1-0, 2-3 stitch pattern, as shown in B of FIG. 1. Again simultaneously, the top guide bar (bar 1) manipulates the other set of ground yarns 24 as they are fed from their respective warp beam to traverse in accordance to the needles 10 to stitch the ground yarns 24 in a repeating 1-0, 0-1 stitch pattern as shown in C of FIG. 1.

The pile yarns 4 are inter-knitted with one another and the ground yarns 14, 24. Each pile yarn 4 is formed in closed-needle loops 6 that alternate from course to course between wales, the wales being spaced apart by four intervening wales, the needle loops 6 being inter-knitted in relation with the closed-needle loops 16 of the ground yarn 14 in respective wales, and in elongated underlaps 8 extending diagonally between the successive needle loops 6 in a mostly course-wise direction, as indicated in A of FIG. 1. Each ground yarn 14 on the middle bar (bar 2) forms closed-needle loops 16 that alternate from course to course between wales spaced apart by one intervening wale in a stitch pattern 1-0, 2-3, as indicated in B of FIG. 1. Each ground yarn 24 on the top bar (bar 1) is knitted in a course-wise direction within singular wales, to form open-needle loops 26, in a stitch pattern 1-0, 0-1 on every needle 10, as indicated in C of FIG. 1.

The ground yarns 14, 24 form a base or substrate to the fabric essential for the pile yarns 4 to be held in a dimensionally stable support system. As those skilled in the art will understand, the stitch pattern of one set of ground yarns 24 reduces stretch in the machine direction of the fabric, while the stitch pattern of the other set of ground yarns 14 gives structural integrity to the fabric perpendicular to the machine direction. The underlaps 8 of the pile yarns 4 appear collectively at the technical back of the fabric to provide a smooth soft feel on the technical back, and to provide exposed fibers which can be further processed to change the subsequent look and feel of the fabric. These pile-like loops are exposed such that they may be readily napped, sanded, or brushed, or raised and broken through other means. If desired, the pile may then be sheared to create a uniform fiber height.

By breaking the fibers through any number of conventional methods, such as napping, sanding, brushing, or shearing, the underlaps of the pile yarn 8 are severed to form discrete pile yarn segments at each needle loop 6. These needle loops 6 are held into the base fabric by the ground yarns 14, 24 and their associated needle loops 16, 26. The microdenier yarn that comprises the pile yarn 4 has sufficient integrity to extend outwardly from the technical back of the fabric. The resulting surface of the technical back of the fabric has a smooth and soft velvet-like feel due to the plurality of raised fibers covering the ground structure.

Figure 8:
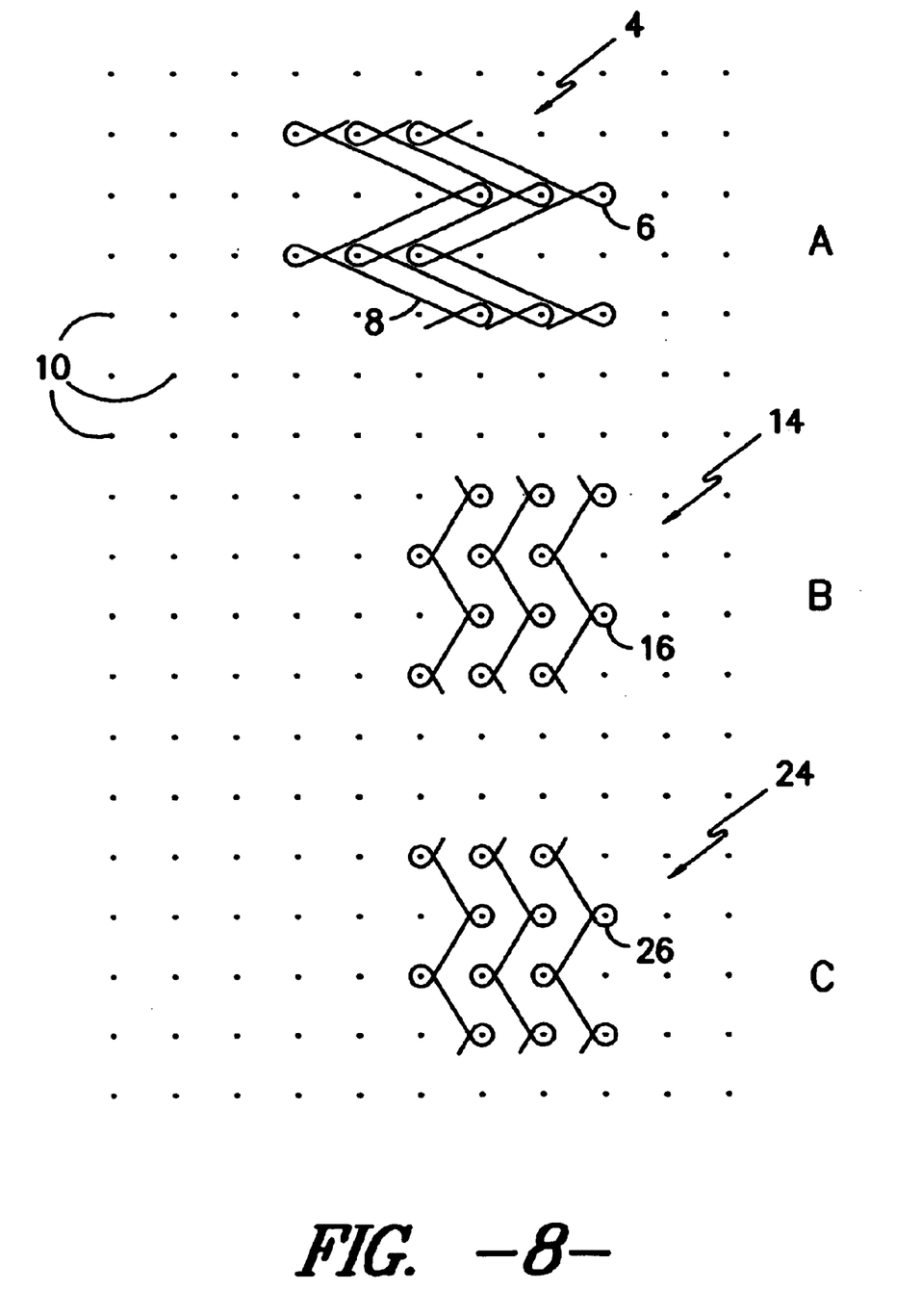
FIG. 8 is a conventional dot diagram for the stitch orientation for an alternative embodiment of the knitted fabric of the present invention.

In FIG. 8, the knit structure is as follows:

| | |
|---|---|
| Pile yarn knitted as: | 1-0, 3-4 stitch pattern (A) |
| Ground yarns knitted as: | 1-2, 1-0 stitch pattern (B) |
| | 1-0, 1-2 stitch pattern (C) |

The numerical references in FIG. 8 carry the same meaning as in FIG. 1. Hence, FIG. 8 shows an alternative knit structure.

The bottom or pile yarns 4 are preferably microdenier polyester yarns, to provide greater surface area for improved print definition and moisture absorption/transport.

Prior to, during or subsequent to the formation of the present fabric, the invention provides for treating the yarn or fibers and/or finishing the fabric to provide enhanced physical properties in terms of fabric hand and wear performance, absorbency, wicking, soil release, odor release, printability, durability, and/or the like.

The present invention's unique combination of yarn types and yarn sizes, as described above resists the tendency of the fabric to stretch, creep or pill. In essence, by using microdenier yarns in the pile yarn, the individual filaments are more likely to completely break and separate from the fabric under abrasion than larger filaments. Therefore, fine denier yarn reduces the tendency of the fabric to have a pilling effect, whereby broken fibers accumulate on the surface of the fabric. The microdenier yarn also enhances the density, feel and softness of the fabric when further processed, as the filaments intermingle on the surface resulting in a velvet-like effect on the technical back. With the ground yarns possessing a smaller total denier than the pile yarns, the ground yarns are hidden by the microdenier pile yarn and are protected from processing damage. This enables the ground structure to remain intact and to serve as the structural base of the fabric. By using monofilament ground yarns, there is minimal stretch since there is no fiber entanglement and reduced fiber elongation. This reduced elongation helps to eliminate fabric creep when the fabric is placed under strain for extended periods.

U.S. Pat. No. 5,935,484 hereby incorporated by reference herein describes lubricant and soil release finishes for yarns. In accordance with one aspect of the present invention, a yarn and/or fabric, is treated with a lubricant and soil release finish composition prior to, during, and/or following fabric formation.

As described in U.S. Pat. No. 5,935,484, prior to fabric formation, synthetic yarn and yarn blends containing synthetic fibers can be processed to provide increased strength, stretch and bulk, and to enhance their appearance. The processing steps may include heating and drawing to provide a degree of orientation to the yarns, as well as texturing with mechanical action. After the yarns have been modified as desired, a lubricant can be applied to reduce friction during subsequent processing steps, such as winding, weaving, or knitting.

The washability and moisture transport properties of fabrics made from synthetic fibers may be improved by treating the fabric with a soil release agent. In one example, a soil release agent, which is the condensation product of dimethyl terephthalate, ethylene glycol and polyethylene glycol, is added to the bath during jet dyeing of polyester, and the agent is exhausted into the fibers of the fabric. Following the dyeing step, the fabric is rinsed, dried and heat set.

One possible shortcoming of adding or applying the soil release agent during the dye cycle, is that it is necessary to process the fabric in the dyeing equipment, even if the fabric is not going to be dyed, for the sole purpose of providing the soil release treatment. Also if the soil release agent is applied after fabric formation, then when the yarn is sent to different locations to be woven or knitted, or if the yarn is sold, each location may be required to have equipment for applying the soil release agent.

In accordance with the present invention, the yarn can be treated prior to fabric formation or knitting and/or the fabric can be chemically treated during the dyeing stage or dye cycle.

According to at least one embodiment of the present invention there is provided a knitted polyester fabric that resists fraying, making it possible to produce fabric items with cut edges. Manufacturing costs are therefore low. The fabric is also dimensionally stable and it prints well.

Advantageously, the fabric is a micro-knitted synthetic fabric, preferably a warp-knitted plush polyester fabric. The fabric may be made from a pile yarn and a ground yarn. The pile yarn is preferably a micro-denier yarn of less than or equal to 1.1 denier. The ground yarn is preferably a monofilament of no less than 10 denier, or alternatively it may be a multi-filament yarn. Advantageously, the fabric is substantially as described in U.S. Pat. No. 5,916,273. Once the yarn and/or fabric is treated, the resultant micro-knitted fabric has good water holding capacity and wicking ability.

Advantageously, the fabric has weight of from two to twenty ounces per square yard, preferably seven to nine ounces per square yard. It is therefore dense, which enhances water absorption and retention.

Advantageously, the fabric has a first face that in use is the exposed face of the fabric layer, and the first face (the technical back of the fabric) is sanded, brushed, napped, or otherwise treated to break or raise the surface, so as to form a plush or pile. This provides for a good print quality. Preferably, the first face of the fabric is sanded to produce a pile or velour. The first face of the fabric also has the most overlaps, which enhances or facilitates absorption, wicking, density, transport, dissipation, and the like. Advantageously, the fabric has a second face that in use is the back surface. The second face (the technical front of the fabric) is advantageously relatively smooth and has little stretch. Although it is preferred to use the pile surface (technical back) as the upper face or surface (for printing), it is to be understood that both sides of the preferred fabric are absorbent and it may be invented as desired.

Advantageously, the yarn and/or fabric is chemically treated to render it hydrophilic. For example, the fabric may be treated with an anionic-ethoxylated sulfonated polyester (AESP, surfactant/stabilizer agent) and a high molecular weight ethoxylated polyester (HMWEP, lubricant/softener agent). This treatment allows the polyester fabric to absorb water very rapidly and promotes wicking, water transport, and dissipating through the fabric, and liquid retention, with the result that the surface of the fabric quickly feels dry to the touch. The treatment also helps to prevent staining, improves washing performance and reduces creasing.

The fabric layer may have a textured surface that includes raised and/or recessed surface formations, recesses, grooves, or the like. This greatly increases the surface area of the fabric. The first face (technical back) of the fabric can be printed, heat transfer printed, ink jet printed, electrostatic printed, screen printed, or the like.

Advantageously, the fabric includes a warp-knitted plush polyester fabric, which does not fray and so avoids the need for hemming or sealing the edges of the fabric.

Advantageously, an image is heat transfer printed onto the fabric in, for example a heated press. A large area of fabric can be printed in a single operation, from a single transfer sheet, reducing alignment problems and allowing more efficient printing. Advantageously, the image includes a plurality of printed margins and the fabric can be cut up (or punched out) along the printed margins to separate the individual items, which makes cutting or punching out very simple.

Advantageously, the fabric is chemically treated to render it hydrophilic, preferably before the printing operation. Advantageously, the fabric is chemically treated with an anionic-ethoxylated sulfonated polyester (AESP) and a high molecular weight ethoxylated polyester (HMWEP).

Figure 2:
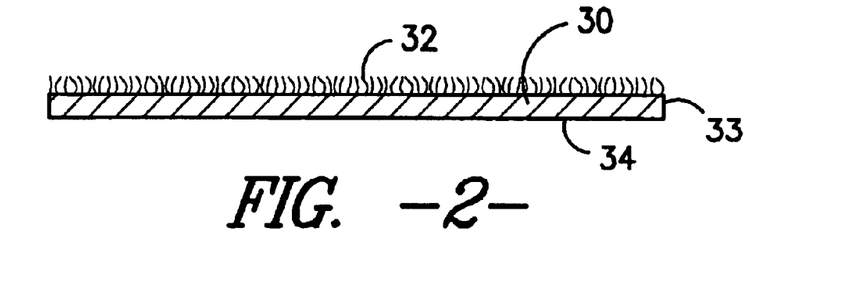
FIG. 2 is a schematic cross section illustration of a piece or section of treated knit fabric.
Figure 3:
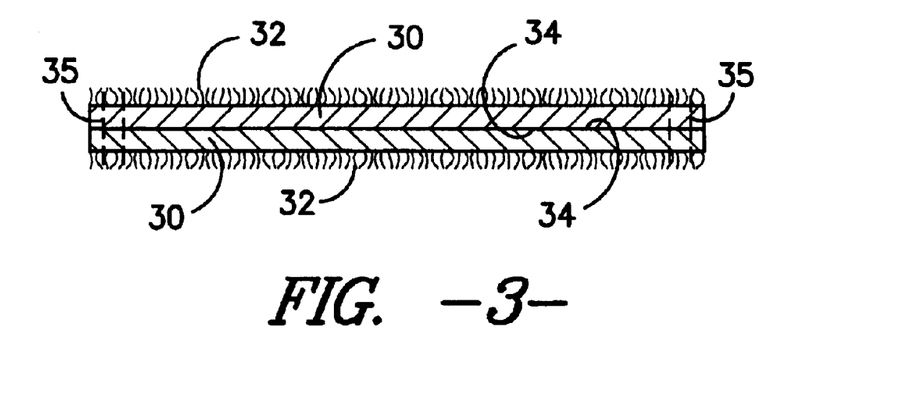
FIG. 3 is a schematic cross section representation of a multi-layer fabric item having first and second pieces or sections of fabric joined together.

With reference to FIGS. 2 and 3 of the drawings, a section or piece of fabric or textile material, an item, product, or the like 30 is preferably made from micro-knitted polyester fabric such as that sold, for example, by the Milliken Corporation under the trademark ENCORE. In one example, this fabric is made of 100% polyester fibre and is constructed as a micro-knit having a weight of about 7.5±0.3 oz/yd$^2$, 66.0±2 courses and 34.0±2 wales. The fabric is sanded to break the upper surface, or face 32, which provides a relatively smooth upper face that is good for printing, for example by heat transfer printing. We have discovered that this fabric does not fray, even after prolonged use of the fabric and many washing cycles. The fabric does not have to be hemmed or the edges sealed in any other way, and the fabric 30 can therefore have a simple cut edge 33. This is an important advantage, which greatly simplifies the manufacturing process as described more fully below.

The fabric 30 also has good dimensional stability, is light fast and has a dense construction, which prevents seeping through the fabric and provides a good printing surface. The microdenier fibres in the fabric provide a high surface area for good water holding capacity and wicking.

Some examples of suitable polyester microdenier fabrics are given below:

|  | Example 1 | Example 2 | Example 3 |
|---|---|---|---|
| Construction | Micro-knit | Micro-knit | Micro-knit |
| Width | 62.0" ± 1" | 64.0" ± 0.5" | 63.0" ± 1.0" |
| Weight (oz./sq. yd) | 7.50 ± 0.30 | 12.38 ± 0.30 | 5.25 ± 0.40 |
| Weight (oz./lin yd) | 13.10 ± 0.50 | 22.00 ± 0.50 | 7.80 ± 0.50 |
| Courses | 66.0 ± 2 | 60.0 ± 2 | 58.0 ± 2 |
| Wales | 34.0 ± 2 | 37.0 ± 2 | 40.0 ± 2 |
| Fibre blend | 100% polyester | 100% polyester | 100% polyester |

In accordance with one example the fabric production process includes the following steps:

A. Texture the yarns. The texturing step can include chemically treating the yarns to provide a durable AESP and HMWEP coating.

B. Knit the fabric.

C. Sand the technical back of the fabric (which forms the exposed face of the fabric).

D. Dye or scour the fabric for bulking and to increase density, optically brighten the fabric, and chemically treat the fabric (to make it hydrophilic). This step usually takes about thirty minutes at 220° F. to 275° F., preferably 266° F. Chemically treating the fabric can be done during the texture step and/or during the dyeing step.

E. Dry and heat set the fabric at, for example, 330° F. to 400° F.

F. Cut the fabric into separate items or roll it for shipment.

In accordance with the preferred embodiment, the fabric is treated with an anionic-ethoxylated sulfonated polyester (AESP) and a high molecular weight ethoxylated polyester (HMWEP). These agents are applied together, in combination, during the yarn texturing stage and/or the dyeing stage of fabric production. The agents may also be added after fabric production, by, for example, spraying, padding, coating, or the like. Such agents are described in U.S. Pat. No. 5,935,484, the content of which is incorporated by reference herein. By way of example, soil release agents include: non-ionic soil release agents having oxyethylene hydrophiles, such as the condensation polymers of polyethylene glycol and/or ethylene oxide addition products of acids, amines, phenols and alcohols which may be monofunctional or polyfunctional, together with binder molecules capable of reacting with the hydroxyl groups of compounds with a poly (oxyalkylene) chain, such as organic acids and esters, isocyanates, compounds with N-methyl and N-methoxy groups, bisepoxides, etc. Particularly useful are the condensation products of dimethyl terphthalate, ethylene glycol and polyethylene glycol (ethoxylated polyester) and ethoxylated polyamides, especially ethoxylated polyesters and polyamides having a molecular weight of at least 500, as well as soil release agents described in the following patents: U.S. Pat. Nos. 3,416,952, 3,660,010, 3,676,052, 3,981,807, 3,625,754, 4,014,857, 4,207,071, 4,290,765, 4,068,035 and 4,937,277. Combinations of anionic soil release agents with oxyethylene hydrophile condensates, such as are generally referred to as sulfonated ethoxylated polyesters and soil release agents are disclosed in the following patents: U.S. Pat. Nos. 3,649,165, 4,073,993, and 4,427,557.

Preferably, the chemical treatment involves the application of 1.5% on weight of fabric (OWF) of the anionic ethoxylated sulfonated polyester together with 1.5% OWF of the high molecular weight ethoxylated polyester, each of which have about 16% solids and which together provide about 0.5% solids OWF. The AESP serves as an anionic stabilizer while the HMWEP serves as a lubricant/softener. The chemical treatment is applied by exhaustion at about 150° F. to 275° F. The AESP and HMWEP can be mixed to provide about 1% to 8% OWF and about 0.1% to 1.0% solids OWF.

The chemical agents work with the anionic dyes and make the fabric super wicking and super absorbent.

The HMWEP and AESP are a dispersion up to about 140° F. and become less soluble at 160° F. and exhaust at 190 to 280° F.

A high temperature application by exhaustion is preferred for durability at about 265° F. to 280° F., enhanced by heat setting of the fabric at about 330 to 375° F.

It is believed that the mechanism of attachment is that the polyester fibres swell and the agents penetrate into the fibres and are anchored to the fibres. One example of an AESP is Milease HPA by Hodgson Chemical, USA. One example of an HMWEP is Lubril QCX by Tennessee Eastman, USA.

In order to increase the water holding capacity of the fabric, the thickness and/or weight of the fabric may be increased, or a blend of fibres including absorbent fibres such as rayon or cotton may be used.

Polyester fabric is naturally hydrophobic, which means that water tends to form beads on the surface of the fabric and is slow to be absorbed. To avoid this problem, and in accordance with the present invention, the fabric is chemically treated with an anionic-ethoxylated sulfonated polyester and a high molecular weight ethoxylated polyester, to make it hydrophilic, absorbent, wicking, and the like. We have found that this leads to much faster absorption of water and improved wicking of water through the fabric, with the result that surface of the fabric remains feeling dry to the touch even after a significant quantity of water has been absorbed.

We have further found that the treated fabric washes far more easily, allowing odors and even oily stains to be removed without difficulty.

With reference again to FIGS. 2 and 3 of the drawings, the fabric section or piece, material, item, product, or the like 30 has an upper pile or velour surface 32 (the sanded technical back of the fabric), a relatively smooth lower surface 34 (the technical face of the fabric), and side edges 33.

With particular reference to FIG. 3 of the drawings, two such pieces of fabric 30 are positioned back-to-back 34 to 34 with the respective outer or upper faces 32 exposed to provide a fabric or cloth item or product having absorbent, wicking, printable outer surfaces 32. The fabric pieces 30 may be attached one to another by sewing 35 or other attachment means known in the art such as adhesives, solvents, ultrasonic welding, laser welding, tacking, or the like.

Figure 4:
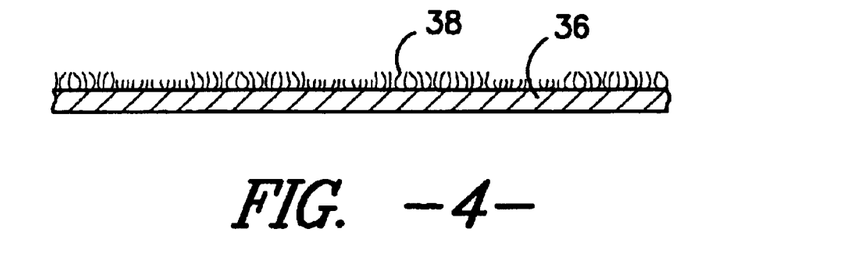
FIG. 4 is a schematic cross section illustration of a section or piece of fabric having a contoured upper surface.

With reference to FIG. 4 of the drawings, upper surface 38 of a fabric piece 36 (sanded technical back) may be textured by creating surface formations such as grooves, recesses, or the like. It is evident that such surface formations provide increased surface area, absorbency, etc.

The fabric may be designed for use as, for example, a cleaning cloth, table covering, or place mat. Alternatively, it may be designed for use as a floor mat such as a play mat or a mat intended for promotional or informational use in shops or other establishments, and may carry an advertisement or other printed matter. The fabric may further be intended for use as a washable shoe insert, Koozies/cozies—printed coverings for a bottle/glass/or other container to keep contents warm and/or cold, coasters, bath mats, outdoor furniture, insoles for shoes, picnic/beach blankets, car mats/custom fittings for the back of SUVs, sunglass cases, gloves—interior, computer cases, protective coverings for sensitive equipment, mitts for car washing or the end of an ice scraper, seat covers, wine bottle covers, bags—handbags—beachbags, inserts for nursing bras, athletic wear, advertising beach towels, sun/lounge chairs for pool or beach side, socks, athletic shoes, sleep mats for children, mouse pads, place mats, bath robes, robes for pool side, robes for athletic teams—swim teams, etc.—to advertise sponsors or the team, mattress covers, inserts for hats/caps (the band that touches the forehead), coat liners, earphones—the part that touches the ear, athletic sweat bands, splints or other supports (medical), ankle or other wraps for support (to wick moisture from skin), back braces, rugs, floor coverings, or the like. The fabric may also be used in feminine hygiene products, diapers, space suits, sweat bands, towels, clothes, or the like.

The knitted polyester fabric was treated with 1.5% AESP and 1.5% HMWEP and tested. The fabric has a good appearance after transfer printing and can be washed many times in industrial washes with no raveling. Preliminary testing results (shown below) demonstrate that the treated knit polyester absorbed about three times as much water as a terry cloth control.

|  | Rate of rise in 30 minutes |
| --- | --- |
| Vertical Wicking Test | |
| 1.    Terry control | 85 mm |
| 2.    Treated knitted polyester | 212 mm |
| Water Absorption Test | |
| Test explanation: amount of water added before overflow (sample size = 10 cm x 10 cm). | |
| 1.    Terry control | 2 ml |
| 2.    Treated knitted polyester | 7 ml |

The fabric and/or yarn can be pre-treated with hydrophilic chemicals, for example by exhaustion, spraying, padding (immersion), foam coating, or the like.

A continuous printing process may be implemented by feeding sheets of treated fabric and print transfer sheets through sets of heated rollers. The printed fabric so formed can then be cut up to make individual items.

Figure 5:
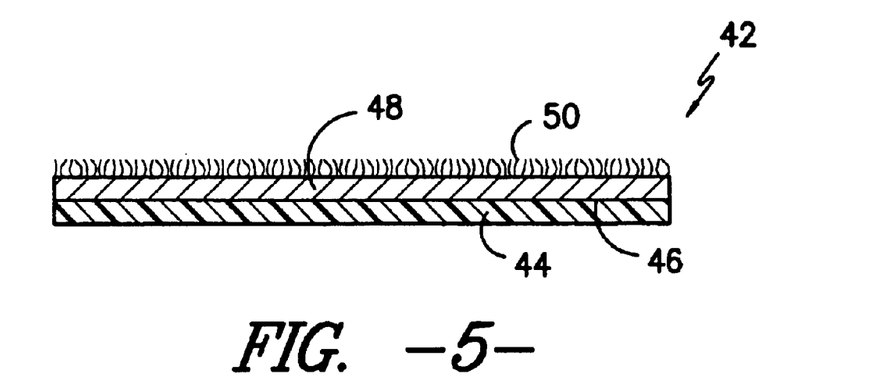
FIG. 5 is a schematic cross section representation of a knit fabric with a spray coating on the bottom surface.

With reference to FIG. 5 of the drawings, a rubber-backed fabric sheet 42 can be made by applying a rubber or foam rubber layer 44 directly to the back 46 of a treated fabric sheet 48 having a pile face 50, for example by spraying, extruding, laminating, or coating using a doctor blade to control the thickness of the backing.

Figure 6:
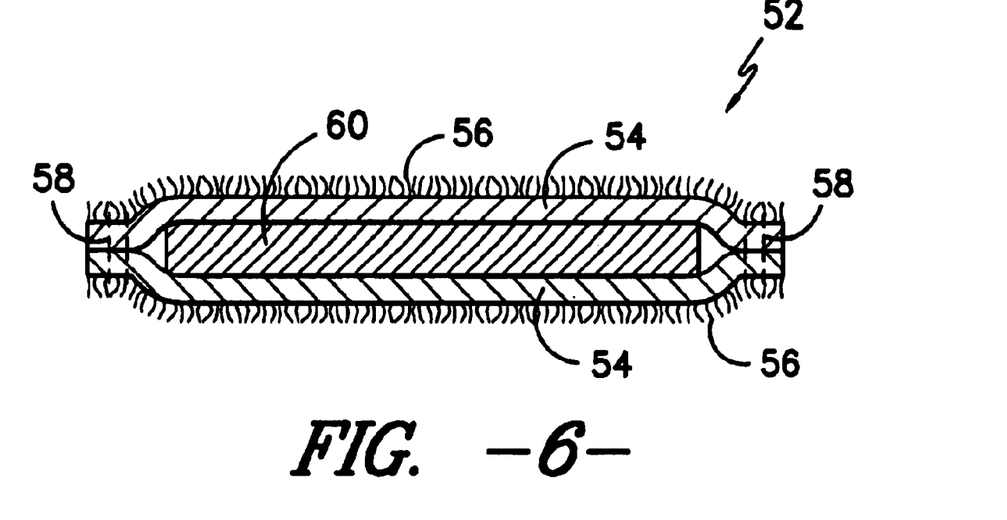
FIG. 6 is a schematic cross section illustration of a multi-layer assembly in accordance with another embodiment of the present invention.

With reference to FIG. 6 of the drawings, a multi-layer item 52 is constructed of two sheets of fabric 54 attached back-to-back and having outer pile or velour surfaces 56. The fabric sheets 54 are attached one to another by, for example, sewing 58. Between the sheets 54 is captured or encapsulated a center absorbent layer or fill 60 such as cotton fabric, cotton blend, or the like.

Figure 7:
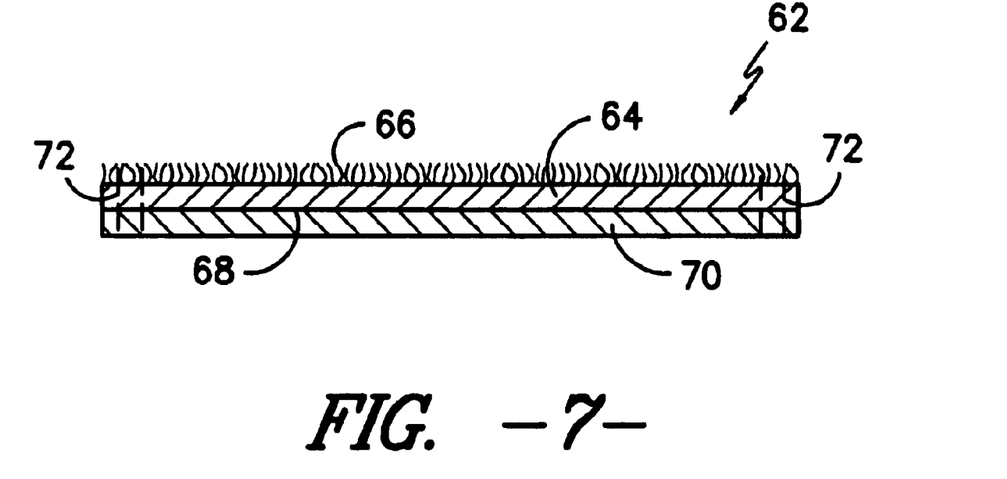
FIG. 7 is a schematic cross section representation of the fabric of the present invention with an additional backing or layer.

With reference to FIG. 7 of the drawings, a multi-layer fabric item or product 62 is shown to include an upper fabric layer 64 having a sanded surface 66 and a smooth surface 68. A second piece of fabric 70 which, for example, is cotton or a cotton blend such as a cotton polyester blend is attached to the lower smooth surface 68 of fabric 64 by, for example, sewing 72, glue, welding, tacking, or the like.

An anti-bacterial, anti-microbial and/or anti-pathogenic agent may be added to the yarn and/or fabric. For example, an anti-bacterial agent may be added during the chemical treatment of the yarn and/or knitted fabric.

To make clean edges around the fabric, article, item, or the like, it is contemplated to use pinking, laser cutting, hot knives, sewing, stitching, coating, or the like.

The fabric may be woven, non-woven, flat woven, flocked, felt, pile fabric, brushed flat woven, needled on one side flat woven, stacked, strudel, or the like. Preferably, the fabric is printable on at least one side.

The lower impervious layer or surface may be coated, extruded, knife coated, laminated, calendered, spray coated, foam coated, or the like.

In accordance with one embodiment of the invention, a non-woven polyester fabric has a thin polyolefin layer extruded on the lower surface thereof.

The fabric layer is preferably 100% polyester, but may alternatively be a polyester/cotton blend, nylon, corn fiber, or other fibers that are conducive to printing and are naturally hydrophilic or can be treated to render them hydrophilic. The fabric material is preferably a microdenier knitted fabric, but it may alternatively be an ordinary knitted fabric or a woven tufted or non-woven fabric.

The hydrophilic agents may be applied by spraying, foam coating, dye jetting, padding, applying during yarn formation, or included in the yarn formation. The fabric may also include a blend of hydrophilic and hydrophobic yarns.

The fabric may be printed by various methods including heat transfer, digital printing (including ink-jet and electrostatic printing), screen printing or other methods, or the fabric or yarn may simply be dyed. The fabric may also include a dyed background color and then be transfer printed over the background color.

The fabric item may consist of a single layer of material having an absorbent, hydrophilic upper surface and a lower surface that is substantially impervious to liquid.

The lower surface may be made substantially impervious to liquid in various different ways, including the following: by chemically treating the fabric back to render it impermeable; by calendering the fabric back to render it impermeable; by the application of heat and/or pressure to render the fabric back impermeable, for example using a polypropylene low melt ground yarn; by laminate backing; by extrusion coat backing; by bonding, tacking, gluing, needling, laser cutting, melting or welding, ultrasonic welding or otherwise attaching an impermeable backing to the fabric layer.

In accordance with one embodiment, the absorbent, wicking, printable fabric or item of the present invention is used as an absorbent cleaning cloth, wipe, towel, or the like, which is preferably reusable, washable, and can have a company name or logo printed thereon. Also, it is contemplated that such cleaning cloths could be sold separately, in packs of 3 or more, or in rolls which are perforated to facilitate sequential removal of the cloths.

Those individuals skilled in the art will recognize and understand that many adaptations of the present invention other than those described herein are readily apparent from or reasonably suggested by the present invention and the foregoing description thereof. As such, while the present invention is described herein in detail in relation to the preferred embodiment, it is to be understood that this disclosure is only illustrative and exemplary of the present invention, and that reasonable variations or modifications are possible within the spirit of the foregoing specification without departing from the scope of the invention. This disclosure is not intended or to be construed to limit the present invention or otherwise to exclude any other embodiments, adaptations, variations, modifications and equivalent arrangements, the present invention being limited only by the claims appended hereto and the equivalents thereof.

What is claimed is:

1. A warp knitted fabric of at least three-bar construction, said fabric comprised of multifilament synthetic pile yarns on the technical back which are raised or broken to produce a plush surface, and monofilament synthetic ground yarns in a dimensionally stable stitch pattern on the technical face, wherein at least said technical back of said fabric is hydrophilic, at least a portion of said pile yarns are comprised of microdenier filaments, and at least said technical back of said fabric is chemically treated with a hydrophilic composition to render said plush surface hydrophilic, said hydrophilic composition comprising a high molecular weight ethoxylated polyester, wherein said hydrophilic composition further comprises an anionic surfactant.

2. The fabric of claim 1, wherein said anionic surfactant is an anionic-ethoxylated sulfonated polyester.

3. A warp knitted fabric of at least three-bar construction, said fabric comprised of multifilament synthetic pile yarns on the technical back which are raised or broken to produce a plush surface, and monofilament synthetic ground yarns in a dimensionally stable stitch pattern on the technical face, wherein at least said technical back of said fabric is hydrophilic, at least a portion of said pile yarns are comprised of microdenier filaments, and at least said technical back of said fabric is chemically treated with a hydrophilic composition to render said plush surface hydrophilic, and wherein at least one of said yarns and fabric are chemically treated with an anionic-ethoxylated sulfonated polyester and a high molecular weight ethoxylated polyester.

4. The fabric of claim 3, wherein said agents are mixed to provide about 1%–8% OWF and about 0.1%–1.0% solids OWF.

5. The fabric of claim 4, wherein said agents are added at about 1.5% OWF each.

6. The fabric of claim 3, wherein at least one of said yarns and fabric is treated by at least one selected from the group consisting of adding an anti-pathogenic agent, dyeing, scouring optically brightening, bulking, and combinations thereof.

7. The fabric of claim 3, wherein said pile yarns are comprised on microdenier filaments characterized by a filament linear density of not greater than 1.1 denier.

8. The fabric of claim 3, wherein said pile yarns have a denier of at least 50.

9. The fabric of claim 3, wherein said monofilament synthetic ground yarns have individual deniers of at least 10.

10. The fabric of claim 3, wherein said pile yarns are knitted in a 1-0, 4-5 stitch pattern and said ground yarns are comprised of at least two sets, one set being knitted in a 1-0, 0-1 stitch pattern, and another set being knitted in a 1-0, 2-3 stitch pattern.

11. The fabric of claim 3, wherein said monofilament synthetic ground yarns have a combined denier that does not exceed that of the pile yarn.

12. The fabric of claim 3, wherein the fabric has an absorbency of at least 5 ml of water before overflow for a 10 cm×10 cm sample.

13. The fabric of claim 3, wherein the fabric has wicking of at least 150 mm of rise of water in 30 minutes.

14. The fabric of claim 3, wherein said plush surface provides for sharp definition printing.

15. The fabric of claim 3, wherein said plush surface has substantially instantaneous moisture dissipation.

16. The fabric of claim 3, wherein the fabric is at least one selected from the group consisting of absorbent, wicking, hydrophilic, printable, launderable, cleanable, durable, dimensionally stable, non-fraying, color fast, and combinations thereof.

* * * * *